May 10, 1960  L. G. BIDDLE  2,935,990
AIR AND VAPOR ELIMINATOR FOR PIPE LINES
Filed May 8, 1958  2 Sheets-Sheet 1

Leslie G. Biddle
INVENTOR.

BY
Attorneys

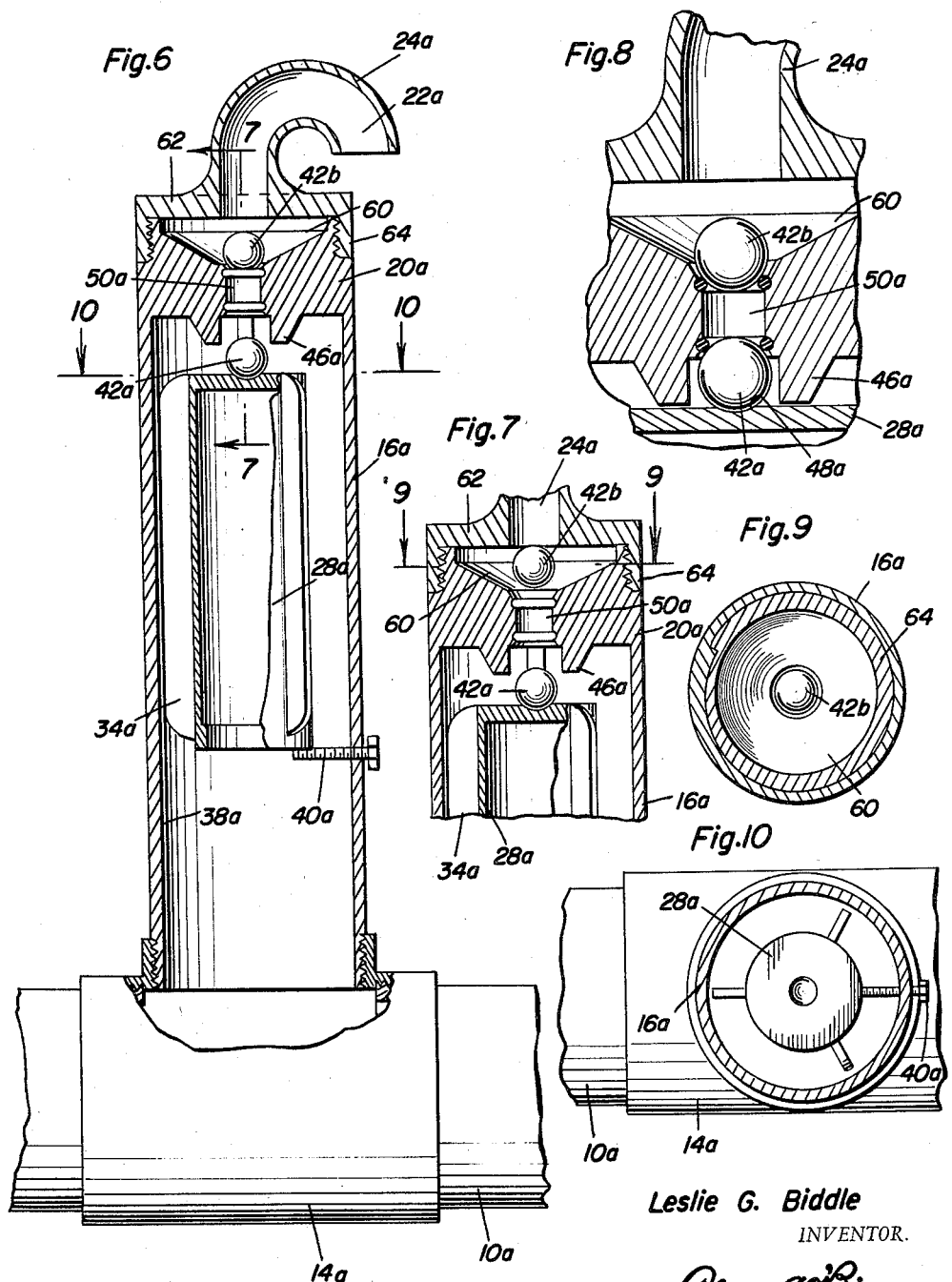

United States Patent Office 2,935,990
Patented May 10, 1960

2,935,990

AIR AND VAPOR ELIMINATOR FOR PIPE LINES

Leslie G. Biddle, Sacramento, Calif.

Application May 8, 1958, Serial No. 733,922

4 Claims. (Cl. 137—202)

This invention relates to an air and vapor eliminator for pipe lines and more particularly to a device which automatically removes the air and/or vapors from a petroleum pipe line.

An object of the invention is to provide a pressure operated eliminator for the air or vapor or both in a pipe line. In practice of the invention there is a casing adapted to attach to a pipe line, for example, by a T-fitting, and in which the oil or other liquid in the pipe line passes. So long as the proper level of liquid is in the casing, a valve is maintained in the closed position by means of a float. But, any vapor or air in the pipe line will rise to the top of the line and enter the casing. It is trapped in the casing above the float thereby building up a pressure in the casing. When this pressure becomes great enough the float is lowered to the point that the valve is opened. Therefore, the vapors under pressure at the top part of the casing escape through a vent that is controlled by the valve.

Another object of the invention is to provide a pressure operated air or vapor eliminator which has the additional feature of also opening in response to vacuum beyond a particular level. Instead of having one valve controlled by the float, a second valve which is vacuum closed and pressure opened responds to vacuum beyond a particular level in order to eliminate trapped air and/or vapors.

Accordingly, in practice of the invention wherein the eliminator operates on either suction or pressure, the float will control one valve. When the float is lowered due to the lack of liquid in the casing, this is an indication of an accumulation of vapors or air in the casing and these will escape through the vent that is controlled by the valve. For suction operation, when the inside pressure, that is the pressure inside the casing is less than atmospheric, the other valve will be gravitationally lowered to the valve or vent closing position. Any vacuum or suction in the container will pull this second valve tightly seated. But when the suction is dissipated and the pressure exits, this valve will open.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 6 is a longitudinal sectional view of the multi- valve construction showing the eliminator attached into a typical pipe line.

Figure 7 is a sectional view taken on the line 7—7 of Figure 6 and showing both valves unseated.

Figure 8 is an enlarged fragmentary sectional view showing both of the valves of Figure 7 in the seated position.

Figure 9 is a sectional view taken on the line 9—9 of Figure 7.

Figure 10 is a transverse sectional view taken on the line 10—10 of Figure 6.

Figure 1:
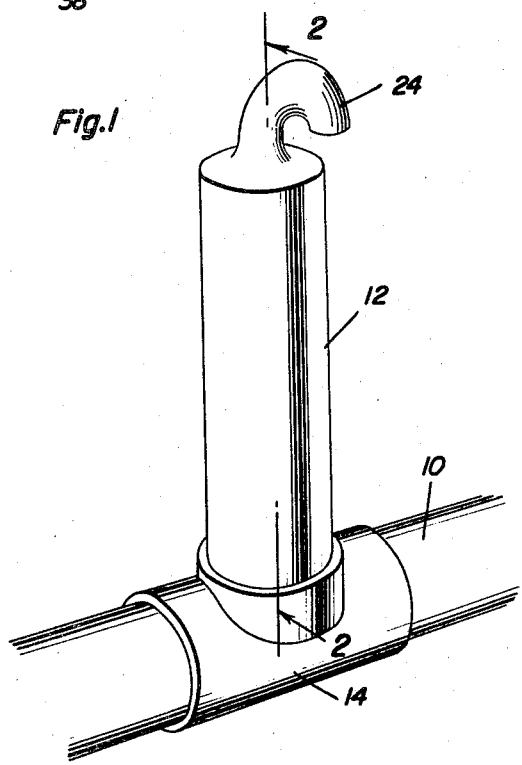
Figure 1 is a perspective view of one embodiment of the invention showing a typical use.
Figure 5:
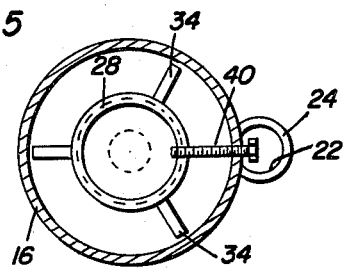
Figure 5 is a transverse sectional view taken on the line 5—5 of Figure 3.

In the accompanying drawings there is a typical pipe line 10 shown in Figure 1. Eliminator 12 is attached to the pipe line by means of a T-fitting 14, and it rises upwardly therefrom. The eliminator consists of a casing 16, preferably but not necessarily cylindrical, and attached to one branch of the T-fitting 14. The upper end of the casing is closed by a transverse wall 20, and this has a vent 22 formed by small curved line 24 that is in registry with the interior of the casing 16. The lower end of the casing is open in order to communicate with the interior of pipe line 10.

A float 28 is mounted for movement in the casing 16. The float consists of a hollow lightweight cylinder 29 which is buoyant and which has an open bottom 30 and a top closed by wall 32. A plurality of guiding fins 34, made of wires or the like are connected to the side walls of the float 28 and are adapted to abut and ride on the inside surface of the side wall casing 16. These constrain the motion of the float 28 insofar as lateral movement is concerned but permit free flow of liquid and/or air or other vapors to pass by the float.

The lower limit of the travel of the float is established by a stop 40. The stop is a bolt 40 in a tapped opening 41 in a side wall of casing 16. The bolt extends inwardly of the casing and is struck by the float as the float moves to a down position. The purpose of the stop is to prevent the float from entering the pipe line 14 and also to prevent the ball 42 that constitutes a valve or valve element, from escaping from its cage 44.

The ball cage is established by a plurality of ribs 46 that depend from the inner surface of wall 20 and that are spaced at their confronting ends from each other to form a pocket. A recess 48 is formed in the top wall 32 of float 28 and is adapted to accommodate the ball. Accordingly the ball can move from the recess 48 to the pocket between the spaced ribs 46. It cannot move out of this cage because movement to the left, right, front or rear will result in the ball striking one of the ribs 46 and returning to the recess 48.

Port 50 is controlled by valve ball 42. The port has a seat formed by an O ring 52 located in a circumferential groove around the port. The port registers with vent 22 and permits the vapors and/or air to escape to the atmosphere.

In use the casing 16 is attached to the pipe line as described previously. As liquid flows into casing 16, float 28, being buoyant, is elevated to the point that it is necessary for ball 42 to become disposed in the seat formed by O-ring 50. This is a normal position for the float and ball 42. However, when vapors or air under pressure enters the pipe line 14, these rise to the top of the pipe and enter the casing 16. Being lighter than the liquid, they move to the top of the casing 16 and lower the liquid level in the casing. The float 28 becomes correspondingly lowered thereby unseating the ball 42 and enabling the vapors or air to escape through vent 22. Upon escape of these vapors, additional liquid enters casing 16 thereby raising float 28 and causing it to elevate ball 22 into the valve closed position.

Figure 3:
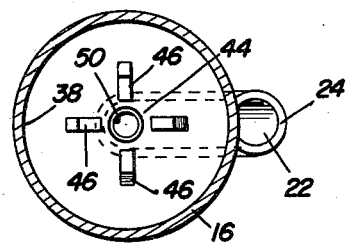
Figure 3 is a transverse sectional view taken on the line 3—3 of Figure 2.
Figure 2:
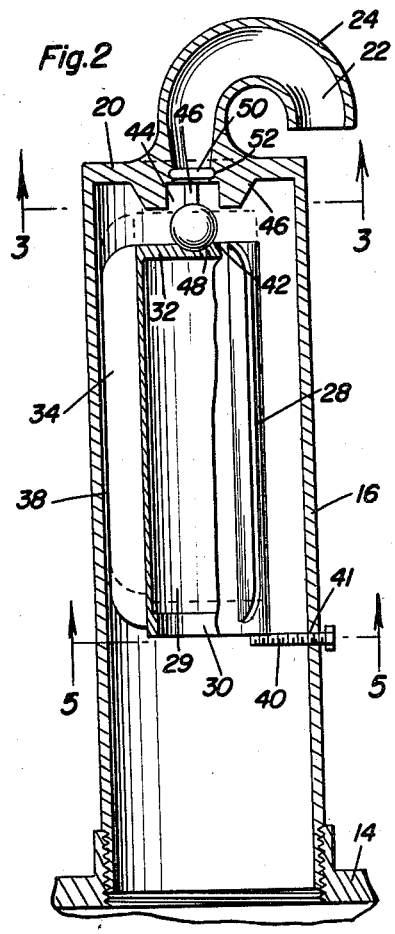
Figure 2 is a sectional view taken on the line 2—2 of Figure 1.
Figure 4:
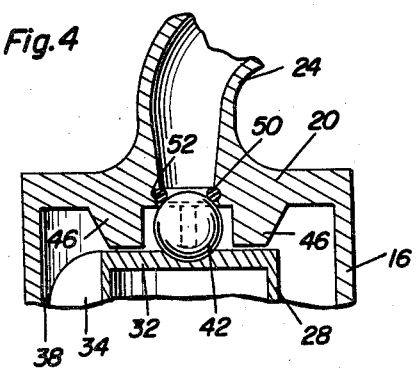
Figure 4 is a sectional view showing the valve or valve element in the closed position.

In Figure 6 there is a modification which is in a sense, double acting. An identical lower part and structure exists between the embodiments of Figures 2 and 6. The distinction is in the top part of Figure 6. Wall 20a has an additional valve ball 42b that controls port 50a. The ball 42b is very light in weight and is easily acted on by the influence of pressures. The ball is confined in a chamber 60 established by top wall 62 on the threaded upper end of casing 16a. The top wall 62 is a part of a cap whose side wall 64 is connected to the modified wall 20a. Vent 22 is established by small curved pipe 24a and registers with chamber 60. Chamber 60 is in communication with the controlled port 50a. The chamber 60 within which ball 42b is confined, has a sloping bottom wall so that the ball 42b is gravitationally lowered to the port 50a closing position. So long as vacuum exists in the top part of casing 16a, ball 42b remains seated. But if the float 28a becomes lowered due to the existence of pressure accumulation of air or vapor above the liquid level, ball 42b being light in weight, is lifted by this pressure to permit the air or vapors to be vented. Should the float 28a be lowered by reason of a vacuum in casing 16a, ball 42b will close port 50a excluding inflow of air from the atmosphere.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An air and vapor eliminator for a pipe line, said eliminator comprising a casing having an open lower end adapted to register with the pipe line and adapted to rise upwardly above the level of the pipe line, a float having a top wall, said float being movable in said casing, a stop carried by said casing and establishing a limit of travel of said float in a downward direction, a valve actuated by said float and disposed in said casing, said casing having a port controlled by said valve, said valve adapted to be held in the closed position when said float is elevated by floatation in said casing and adapted to be opened when said float is lowered due to the build up of pressure above the liquid level in said casing thereby opening said valve port and discharging the pressure from above the water level in said casing, said valve comprising a ball, said top wall having a recess therein freely receiving the lower portion of said ball and positioning said ball in alignment with said port and out of the path of flow of fluids exiting through said port, a valve cage in said casing and composed of a plurality of ribs that protrude downwardly from the upper wall of said casing toward the top wall of said float and terminate a slight distance therefrom when said valve first engages said port said ball being confined between said ribs when said float is resting on said stop, and said ribs defining passageways therebetween through which fluids may pass.

2. An air and vapor eliminator for a pipe line, said eliminator comprising a casing having an open lower end adapted to register with the pipe line and adapted to rise upwardly above the level of the pipe line, a float having a top wall said float being movable in said casing, a stop carried by said casing and establishing a limit of travel of said float in a downward direction, a valve actuated by said float and disposed in said casing, said casing having a port controlled by said valve, said valve adapted to be held in the closed position when said float is elevated by flotation in said casing and adapted to be opened when said float is lowered due to the build up of pressure above the liquid level in said casing thereby opening said valve port and discharging the pressure from above the water level in said casing, said valve comprising a ball, said top wall having a recess therein freely receiving the lower portion of said ball and positioning said ball in alignment with said port and out of the path of flow of fluids exiting through said port, a valve cage in said casing and composed of a plurality of ribs that protrude downwardly from the upper wall of said casing toward the top wall of said float and terminate a slight distance therefrom when said valve first engages said port, said ball being confined between said ribs when said float is resting on said stop, said ribs defining passageways therebetween through which fluids may pass, a second valve in said casing and adapted to be suction closed and pressure opened, said second valve controlling said port and contained within said casing.

3. The eliminator of claim 1 wherein said port has an O-ring therein constituting a valve seat, and said valve being adapted to fit on said O-ring valve seat.

4. The eliminator of claim 2 wherein said port has a pair of O-rings therein each constituting a valve seat, and said valves each adapted to fit on one of said O-ring valve seats.

References Cited in the file of this patent

UNITED STATES PATENTS

| | | |
|---|---|---|
| 653,255 | Loetzer | July 10, 1900 |
| 725,640 | Wemmer | Apr. 14, 1903 |
| 935,808 | Parker | Oct. 5, 1909 |
| 2,083,584 | Wineman | June 15, 1937 |
| 2,627,868 | Runnels | Feb. 10, 1953 |
| 2,705,502 | Thompson | Apr. 5, 1955 |
| 2,812,772 | Moore | Nov. 12, 1957 |

FOREIGN PATENTS

| | | |
|---|---|---|
| 1,063,050 | France | Dec. 16, 1953 |